United States Patent
Ahn et al.

(10) Patent No.: US 9,324,245 B2
(45) Date of Patent: Apr. 26, 2016

(54) APPARATUS AND METHOD FOR CREATING ARTIFICIAL FEELINGS

(71) Applicant: KOREA INSTITUTE OF INDUSTRIAL TECHNOLOGY, Cheonan (KR)

(72) Inventors: Ho Seok Ahn, Incheon (KR); Dong Wook Lee, Incheon (KR); Woong Hee Shon, Seongnam (KR)

(73) Assignee: KOREA INSTITUTE OF INDUSTRIAL TECHNOLOGY, Cheonan (KR)

( * ) Notice: Subject to any disclaimer, the term of this patent is extended or adjusted under 35 U.S.C. 154(b) by 424 days.

(21) Appl. No.: 13/714,344

(22) Filed: Dec. 13, 2012

(65) Prior Publication Data

US 2014/0170619 A1 Jun. 19, 2014

(51) Int. Cl.
*G06F 15/18* (2006.01)
*G09B 19/00* (2006.01)
*G06N 3/00* (2006.01)
*A63H 3/00* (2006.01)

(52) U.S. Cl.
CPC ............... *G09B 19/00* (2013.01); *G06N 3/004* (2013.01); *A63H 3/00* (2013.01)

(58) Field of Classification Search
CPC ............. G06N 3/008; G06F 17/30598; G06F 17/5022; G06F 21/554; A63H 2200/00; G06K 9/00221; G06K 9/00335; Y10S 901/01
See application file for complete search history.

(56) References Cited

U.S. PATENT DOCUMENTS

| | | | |
|---|---|---|---|
| 6,484,068 B1 * | 11/2002 | Yamamoto et al. | 700/245 |
| 6,560,511 B1 * | 5/2003 | Yokoo et al. | 700/245 |
| 7,065,490 B1 * | 6/2006 | Asano et al. | 704/275 |
| 2002/0156751 A1 * | 10/2002 | Takagi et al. | 706/12 |
| 2002/0183896 A1 * | 12/2002 | Ogure et al. | 700/245 |
| 2003/0144764 A1 * | 7/2003 | Yokono et al. | 700/245 |
| 2004/0015265 A1 * | 1/2004 | Asano et al. | 700/245 |
| 2004/0093118 A1 * | 5/2004 | Sabe et al. | 700/245 |
| 2007/0150099 A1 * | 6/2007 | Lee et al. | 700/245 |

(Continued)

FOREIGN PATENT DOCUMENTS

KR 1020070061054 A 6/2007

OTHER PUBLICATIONS

Ahn et al, "Can We Teach What Emotions a Robot Should Express?", Oct. 12, 2012, International Conference on Intelligent Robots and Systems, pp. 1407-1412.*
Ahn et al., "Natural changing of emotional expression by considering correlation of behavior history", Jun. 17, 2011, Consumer Electronics (ISCE), IEEE 15th International Symposium on Consumer Electronics, pp. 369-372, doi: 10.1109/ISCE.2011.5973851, URL: http://ieeexplore.ieee.org/stamp/stamp.jsp?tp=&arnumber=5973851&isnumber=5973167.*

(Continued)

*Primary Examiner* — Stanley K Hill
*Assistant Examiner* — Paulinho E Smith
(74) *Attorney, Agent, or Firm* — Novick, Kim & Lee, PLLC; Jae Youn Kim

(57) ABSTRACT

An apparatus and a method for creating combined artificial feelings to which different basic feelings like a human being's combined feeling are reflected. The apparatus for creating an artificial feeling comprises a feeling value group creation part which is configured to create a feeling value group having a feeling value which gradually decreased as it gets farther from a basic feeling assigned to a machine apparatus on an internal state coordinate system of a machine apparatus; and a feeling creation part which is configured to create, as a feeling of a machine apparatus, a group of a feeling value of each feeling value group that a coordinate of an internal state input value of the machine apparatus indicates on the internal state coordinate system.

9 Claims, 4 Drawing Sheets

(56) References Cited

U.S. PATENT DOCUMENTS

| | | | |
|---|---|---|---|
| 2007/0168894 A1* | 7/2007 | Iwashita | 716/4 |
| 2009/0248372 A1* | 10/2009 | Ryu et al. | 703/2 |
| 2009/0285456 A1* | 11/2009 | Moon et al. | 382/118 |
| 2013/0216098 A1* | 8/2013 | Hasegawa et al. | 382/103 |
| 2014/0093849 A1* | 4/2014 | Ahn et al. | 434/236 |
| 2014/0095570 A1* | 4/2014 | Ahn et al. | 708/523 |
| 2014/0170619 A1* | 6/2014 | Ahn et al. | 434/236 |
| 2014/0172163 A1* | 6/2014 | Ahn et al. | 700/245 |
| 2014/0172771 A1* | 6/2014 | Ahn et al. | 706/52 |

OTHER PUBLICATIONS

Lee et al., "A General Behavior Generation Module for Emotional Robots Using Unit Behavior Combination Method", Oct. 2, 2009, The 18th IEEE International Symposium on Robot and Human Interactive Communication, pp. 375-380.*

Ahn et al., "A Behavior Combination Generating Method for Reflecting Emotional Probabilities using Simulated Annealing Alogorithm", Aug. 3, 2011, 20th IEEE Internation Symposium on Robot and Human Interactive Communications, pp. 192-197.*

* cited by examiner

APPARATUS AND METHOD FOR CREATING ARTIFICIAL FEELINGS

BACKGROUND OF THE INVENTION

1. Field of the Invention

The present invention relates to an apparatus and a method for creating artificial feelings, and particularly to an apparatus and a method for creating artificial feelings which make it possible to actually express the feelings of a machine apparatus such as a robot, etc. like human being's combined feelings in such a way that the current feelings of a robot are created in the forms of the groups consisting of feeling values of different feeling value groups having a plurality of basic feelings.

2. Description of Related Art

The feelings of a machine apparatus such as a robot, etc. is generally limited to the feelings created at a specific position of a feeling space with a certain number of feelings which is previously set in accordance with an input via a sensor.

FIG. 1 is a schematic view illustrating a conventional robot's feeling expression method.

The calculation of the current feeling value of a robot is needed in order to make a robot express its feelings. Emotion, in other words, feelings is rarely decided in a specific form of feeling like happiness or sadness. Though a human being currently feels happiness, part of another feeling such as a feeling of surprise and a feeling of anger appears in a combined form, inevitably reflected. In other words, the expression of a feeling comes from a result of the reflection of very combined and detailed feelings. In order to implement an actual feeling expression in a robot, the feeling values adapted to a robot might be expressed in a form of vectors which reflects different and detailed feelings such as happiness, sadness, surprise, anger, etc.

As shown in FIG. 1, a feeling and a feeling expression corresponding to the feeling are mapped on a certain position of a fixed dimension space with the aid of a 2-dimensionally or a 3-dimensionally fixed space so as to express the feelings of a robot. The feeling values can be expressed and calculated as a vector value corresponding to a certain position in the space.

In other words, feelings are mapped on multiple points in a vector space, and a feeling expression corresponding to each feeling is mapped at 1:1. If a specific feeling vector is given, one feeling which is closest among the feelings mapped on the specific feeling vector and in the vector spaces is selected, and the feeling mapped at 1:1 with the selected feeling can be finally expressed.

Since there is a limit in manually mapping the feeling and the feeling expression corresponding to the feeling on a number of coordinates in the vector space, the conventional method of FIG. 1 is directed to selecting a small number of coordinates and to mapping a feeling corresponding to each coordinate and a feeling expression behavior corresponding to the feeling and then to analyzing a feeling value of a robot and to selecting a feeling of the closest coordinate, thus performing a feeling expression.

For example, a feeling value 1 {happiness 1, sadness 0, surprise 0, anger 0} is set to be expressed at a coordinate of 1 in a 4-dimensional vector space, and when a feeling value 2 {happiness ¾, sadness ¼, surprise 0, anger 0} and a feeling value 3 {happiness ¾, sadness 0, surprise ¼, surprise 0} are closer to a coordinate of 1 than the coordinate which expresses another feeling, the feeling values 1, 2, 3 all perform the feeling expressions set in the coordinate of 1.

In the above mentioned way, the conventional method is configured in such a way that though the internally, actually created feeling values differ from each other, the most similar one among the feeling values mapped on the coordinate of 1 is selected as the selected feeling value. Since the feeling expression behavior is selected based on the feeling values of the same coordinate, the types of the expressions appearing by way of an expression organ are same.

Referring to FIG. 2, it will be described in more details. FIG. 2 is a schematic view for explaining a procedure for creating feelings of a robot from a feeling state input value in the conventional art. In FIG. 2, a 1-dimensional feeling coordinate system is used for simplified explanation.

It is assumed that a basic feeling of happiness is set on the coordinate of 1 of the feeling coordinate system, and a basic feeling of sadness is set on the coordinate of −1. When an input value is 0.3, the basic feeling closest to 0.3 is extracted. As shown in FIG. 2, since 0.3 is closer to 1 than −1, the basic feeling of happiness is extracted. Since the basic feeling of happiness is on the coordinate of 1 of the feeling coordinate system, the feeling of the robot finally becomes the coordinate of 1.

According to the above described feeling creation method, though the input value is 0.5, the final feeling of the robot will become the coordinate of 1 like the input value is 0.3.

As for the feeling expression apparatus which expresses with eyes, a mouth, a gesture, etc. by receiving the feelings of the robot created by the above described feeling creation method, though the feeling state input values are different like 0.3, 0.5, etc., the same coordinate of 1 is expressed as the feeling of the robot. So, though the input values are different in most of the conventional robot, the same feelings are expressed.

In terms of the feelings of a human being, happiness could be combined with other feelings such as sadness, surprise, etc. So, the degree of the happiness appears different depending on how much another feeling such as sadness, surprise, etc. is reflected in the happiness. There might also be a difference in the expression of feelings depending on the degree of happiness.

Since what the robot's feeling expression most needs is a feeling expression which is closest to the expression of a human being, a combined feeling should be created, which combined feeling needs a combined feeling of a human being in order for a robot to express the feeling which is closest to that of a human being.

The Korean patent publication number 2007-0061054 discloses a robot and a method which are directed to creating a plurality of feelings such as a first feeling and a second feeling; however the first feeling disclosed in the above mentioned publication comes from a feeling (surprise feeling, fear feeling, etc.) created in the form of a robot's feeling without external evaluations based on the information received from a sensor part, and the second feeling comes from a feeling (feelings of happiness, anger, rejection, neutral position, sadness, partial fear, etc.) created by means of an evaluation based on a list standard of a database in addition to the information from a sensor and an influence evaluation of time, etc. In other words, the above mentioned patent publication does not disclose combined feelings which are closest to the combined feelings of a human being, so the above described patent publication has the limits like the technologies of FIGS. 1 and 2.

SUMMARY OF THE INVENTION

Accordingly, it is an object of the present invention to provide an apparatus and a method for creating artificial feelings which make it possible to more actually implement a feeling expression of a robot like a combined feeling of a human being in such a way to create the current feelings of a robot in the forms of the groups consisting of feeling values of different feeling value groups having a plurality of basic feelings.

The technical problems to be resolved by the present invention are not limited to the above mentioned technical problems, and the other technical problems not mentioned might be clearly understood to an ordinary person skilled in the art.

To achieve the above objects, there is provided an apparatus for creating an artificial feeling, comprising a feeling value group creation part which is configured to create a feeling value group having a feeling value which gradually decreases as it gets farther from a basic feeling assigned to a machine apparatus on an internal state coordinate system of a machine apparatus; and a feeling creation part which is configured to create, as a feeling of a machine apparatus, a group of a feeling value of each feeling value group that a coordinate of an internal state input value of the machine apparatus indicates on the internal state coordinate system.

In the embodiment, the feeling value group is either one Gaussian distribution having a weight value, a central value and a distribution or a Gaussian distribution with which a plurality of Gaussian distributions are combined.

In the embodiment, the feeling value group creation part is configured to form one feeling value group by combining a plurality of feeling value groups of the same basic feeling.

In the embodiment, each feeling value of the group of the feeling value is expressed in a form of probability.

In the embodiment, the feeling e(k) of the machine apparatus can be expressed like equation 1 below:

$$e(k) = [P(e_1|x(k))P(e_2|x(k)) \ldots P(e_j|x(k)) \ldots P(e_J|x(k))]^T \quad \text{[Equation 1]}$$

where J means the number of basic feelings, and $e_j$ means the feeling value of the j-th basic feeling, and in the equation 1, the feeling probability distribution or feeling value group of $P(x(k)|e_j)$ with respect to the j-th basic feeling on the n-dimensional internal state coordinate system can be decided like the following equation 2:

$$P(x(k)|e_j) = \sum_{m=1}^{M_j(k)} \omega_{j,m}(k) \cdot \eta(x(k)|\mu_{j,m}(k), \Sigma_{j,m}(k)) \quad \text{[Equation 2]}$$

here, $$\eta(x(k)|\mu_{j,m}(k), \Sigma_{j,m}(k)) = \frac{1}{(2\pi)^{\frac{n}{2}}||\Sigma_{j,m}(k)||^{\frac{1}{2}}} \cdot \exp\left\{-\frac{1}{2}[x(k) - \mu_{j,m}(k)]^T \Sigma_{j,m}^{-1}(k)[x(k) - \mu_{j,m}(k)]\right\}$$

where $\omega_{j,m}(k)$ is a weight value of a m-th Gaussian mode of a j-th feeling distribution at the time of k, and $M_j(k)$ is the number of Gaussian modes that the j-th feeling distribution has at the time of k, and $\mu_{j,m}(k)$ is a central value of the m-th Gaussian mode of the j-th feeling distribution at the time of k, and $\Sigma_{j,m}(k)$ is a bandwidth of the m-th Gaussian mode of the j-th feeling distribution at the time of k, and x(k) is the internal state input value at the time of k, and $[\ ]^T$ is a transposed matrix, and the probabilistic expression (probability value) of each feeling value of the feeling probability distribution or feeling value group $P(x(k)|e_j)$ can be calculated using Bayes's rule like the following equation 3:

$$P(e_j|x(k)) = \frac{P(x(k)|e_j)P(e_j)}{P(x(k))} = \frac{P(x(k)|e_j)P(e_j)}{\sum_{i=1}^{J} P(x(k)|e_i)P(e_i)} \quad \text{[Equation 3]}$$

where $P(e_j|x(k))$ which is a probability value of the j-th feeling is used as a posterior probability, and $P(x(k)|e_j)$ is used as a likelihood function, and $P(e_j)$ is a probability in which each feeling value can be selected as the prior probability of $e_j$, and the sum of the prior probability of each feeling value is 1.

To achieve the above objects, there is provided a method of calculating an artificial feeling, comprising creating a feeling value group having a feeling value which gradually decreases as it gets farther from a basic feeling assigned to a machine apparatus on an internal state coordinate system of a machine apparatus; and creating, as a feeling of a machine apparatus, the group of a feeling value of each feeling value group that a coordinate of an internal state input value of the machine apparatus indicates on the internal state coordinate system.

In the embodiment, the step of creating the feeling value group comprises creating one feeling value group in such a way to combine a feeling value group of a plurality of basic feelings by adapting GMM (Gaussian Mixture Model).

In the embodiment, the step of creating, as a feeling of a machine apparatus, the group of a feeling value of each feeling value group comprises converting each feeling value to be expressed in a form of probability by adapting Bayes' rule to the feeling value of the group.

In the embodiment, the step of creating, as an artificial feeling, the group of a feeling value of each feeling value group comprises creating, as a feeling of a machine apparatus, e(k) which can be defined by the equation 1.

According to another aspect of the present invention, there is provided a computer readable recording medium which can be read by a computer with a program. Here, the program represents a certain means (software) for executing a method for creating feelings of a machine apparatus.

Advantageous Effects

According to the present invention, it is advantageous to provide an apparatus and a method for creating artificial feelings which are directed to creating the feelings of a robot in the forms of a group of feeling values of a feeling value group consisting of a plurality of basic feelings as compared to the way that the feelings of a robot are created only with a basic feeling value.

In addition, according to the present invention, an apparatus and a method for creating artificial feelings are provided, which can create a combined feeling to which various basic feelings like a human being's combined feelings are reflected in a combined form. The thusly created combined feelings can be used when more actually implementing the expression of feelings of a robot.

DESCRIPTION OF SPECIFIC EMBODIMENTS

Hereinafter the apparatus and method for creating artificial feelings according to the present invention will be described with reference to the accompanying drawings.

Figure 3:
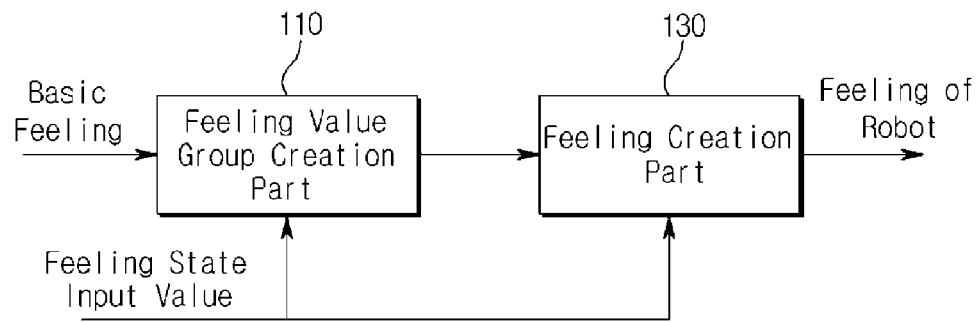
FIG. 3 is a schematic block diagram illustrating an artificial feeling creation apparatus according to an embodiment of the present invention.
Figure 4:
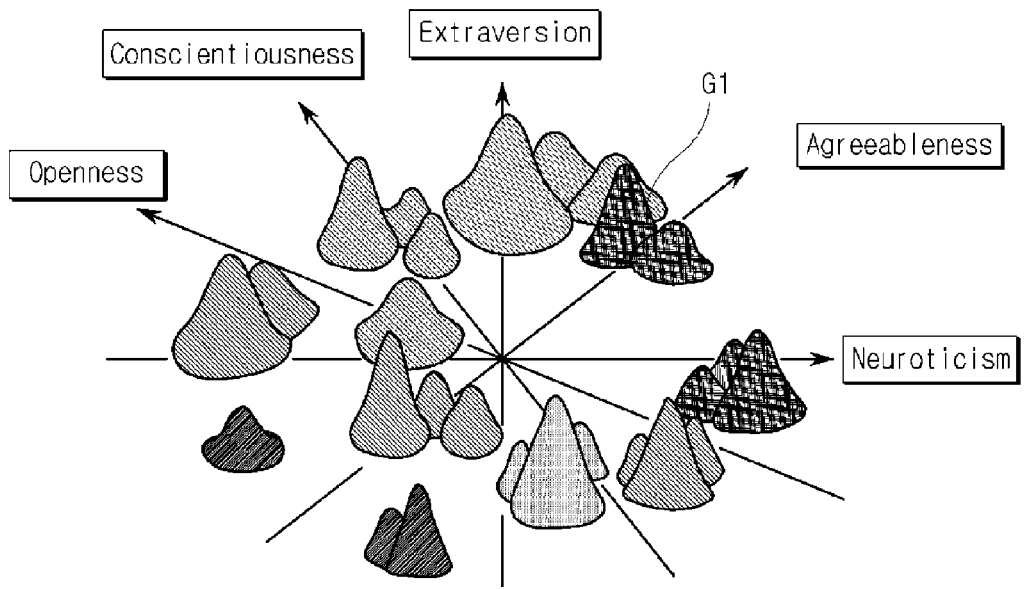
FIG. 4 is a schematic view illustrating a feeling probability distribution which can be adapted to a feeling creation apparatus of a robot of FIG. 3.

FIG. 3 is a schematic block diagram illustrating an artificial feeling creation apparatus according to an embodiment of the present invention. FIG. 4 is a schematic view illustrating a feeling probability distribution which can be adapted to a feeling creation apparatus of a robot of FIG. 3.

FIG. 4 shows a coordinate representing an internal state space which consists of openness to experience, conscientiousness, extraversion, agreeableness and neuroticism which are classified in accordance with FFM (Five Factor Model) in the field of psychology. The conical configurations with the same textures of FIG. 4 each represent a specific feeling. One conical configuration represents one feeling probability distribution, and as shown in FIG. 4, a probability distribution curve representing feelings called G1 is drawn over closer to a basic internal state axis of a robot which is called extraversion and agreeableness.

As shown in FIG. 3, the feeling creation apparatus of a robot comprises a feeling value group creation part 110 and a feeling creation part 130. The feeling creation apparatus comprises a feeling value group creation part 110 which is configured to create a feeling value group having a feeling value which gradually decreases it gets farther from the basic feeling assigned to the robot in an internal state space of the robot, and feeling creation part 130 which is configured to create, as the feeling of a robot, the group of the feeling value of each feeling value that the coordinate of the internal state input value of the robot indicates in the internal state space.

In other words, as shown in FIG. 4, the feeling value group creation part 110 serves to create the feeling distribution of a conical model, and the feeling creation part 130 serves to create the group of the feeling value by way of an externally inputted value and the feeling distribution created by the feeling value group creation part 110.

Figure 2:
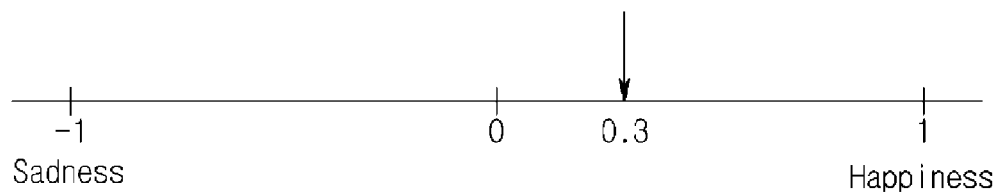
FIG. 2 is a schematic view illustrating a procedure that the feelings of a robot are created from a feeling state input value in the conventional art.

The feeling value group creation part 110 serves to set one feeling distribution in an internal state space as shown in FIG. 4 in a different way as compared to when one feeling is set at one coordinate of the feeling coordinate as shown in FIG. 2.

Here, one feeling distribution is expressed as one generative probability model having a plurality of Gaussian distributions G1 or a Gaussian mode, and the feeling space is expressed as a plurality of generative probability models which define a volume space. At this time, the volume space might be expressed as a plurality of feeling values which are largest at the coordinate of the basic feeling and get gradually reduced as it gets farther from the coordinate of the basic feeling. In addition, the feeling value is an intensity which represents feeling. For example, when assuming that there exists only feeling of pure happiness, the intensity of a specific happiness might be different in terms of such happiness. The feeling value is designed to express the magnitude of such happiness.

The basic feelings are happiness, sadness, anger, surprise, fear, etc. that the user can assign to a robot. Such basic feelings are supposed to be set on the internal state space coordinate system of the robot.

Here the feeling value group can be set in different ways. The configuration of the volume space created from such feeling value group might express the personality and tendency of a robot. For example, as shown in FIG. 4, it might be set that the conical configurations with the same textures have the same feelings, and the conical configuration might differ from each robot, so it can be the natural personality of the robot. It is preferable that when setting the feeling value groups, the feeling value can be set to be the highest on the coordinate of the basic feeling, and the feeling value can be set to get gradually reduced as it gets farther from the coordinate of the basic feeling, which features are advantageous in terms of the natural expression of the feelings, but they are not limited thereto.

The feeling value group can be created in accordance with the internal state input values. There might be an initial external stimulation in order for the robot to express a certain feeling. Such stimulation is detected by a feeling-related sensor installed in a robot, and a result of the detection of the sensor is processed in a form of data which can be expressed on the coordinate system of the internal space state that the robot has. The thusly processed data can become an internal state input value. As it is configured that the feeling value group can change in accordance with an internal state input value, a dynamic feeling expression can be made possible.

The basic feeling might be configured to have the same basic feelings in multiple numbers. At this time, the feeling value group creation part 110 might form one feeling value group by combining the feeling value group of the same basic feelings.

Figure 5:
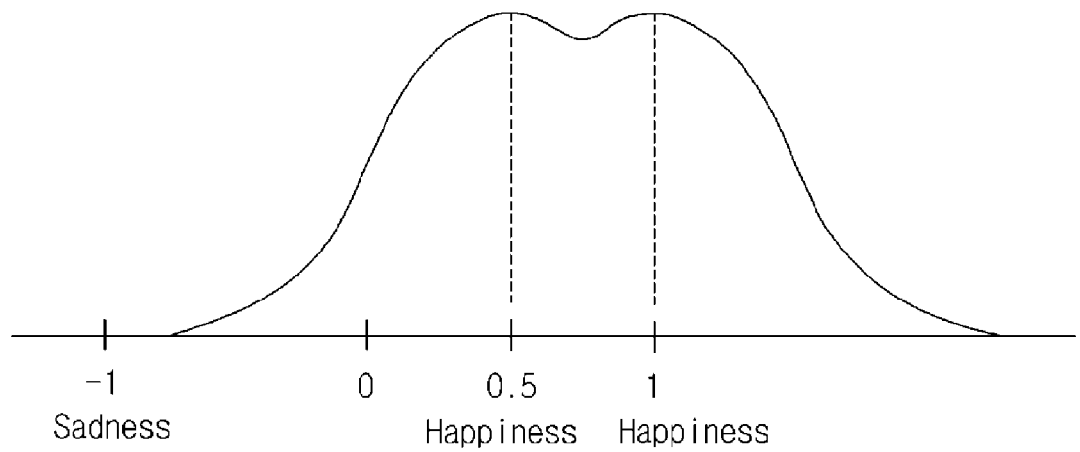
FIG. 5 is a schematic view for explaining a feeling creation procedure when the same basic feeling is added as a feeling creation method which can be adapted to a feeling creation apparatus of a robot of FIG. 3.

In case of a robot to which a learning ability is assigned, the feeling coordinates of happiness might change, be added and deleted by means of the learning. For example, as shown in FIG. 5, the coordinate of 0.5 representing happiness might be added with the aid of the learning in addition to the coordinate of 1 of happiness. The feeling value group creation part 110 serves to create a feeling value group for respective happiness. In this case, since there are two same feelings, they can be combined and expressed one feeling value group.

FIG. 5 is a schematic view for explaining a feeling creation procedure when the same basic feeling is added as a feeling creation method which can be adapted to a feeling creation apparatus of a robot of FIG. 3.

FIG. 5 is a schematic view illustrating the occasion that each feeling value group forms a Gaussian cure about the coordinate of the basic feeling while showing a state that the Gaussian curve of the coordinate of 1 of happiness and the Gaussian curve of 0.5 of happiness which is newly added are combined by means of GMM (Gaussian Mixture Model).

The feeling creation part 130 serves to create, as the feeling of a robot, the group of the feeling value of each feeling value group that the coordinate of the internal state input value of a robot indicates on the coordinate system of the internal state space. The procedure in which the group of the feeling value of each feeling value group is created as a feeling of a robot will be described below in more details.

In the present embodiment of the present invention, the feeling value group is expressed in a form of Gaussian curve;

however it can be expressed in forms of various curves which satisfy the condition of the earlier described volume space, provided that when using Gaussian curve, etc. which has the same distribution about the central value (feeling value, etc. with respect to basic feelings), the distribution of the feeling value defined about the reference feeling on the internal state coordinate of the robot is uniformly formed, so the calculation of the feeling vector representing the feelings of the robot can be made easier, but it is not limited thereto.

Figure 6:
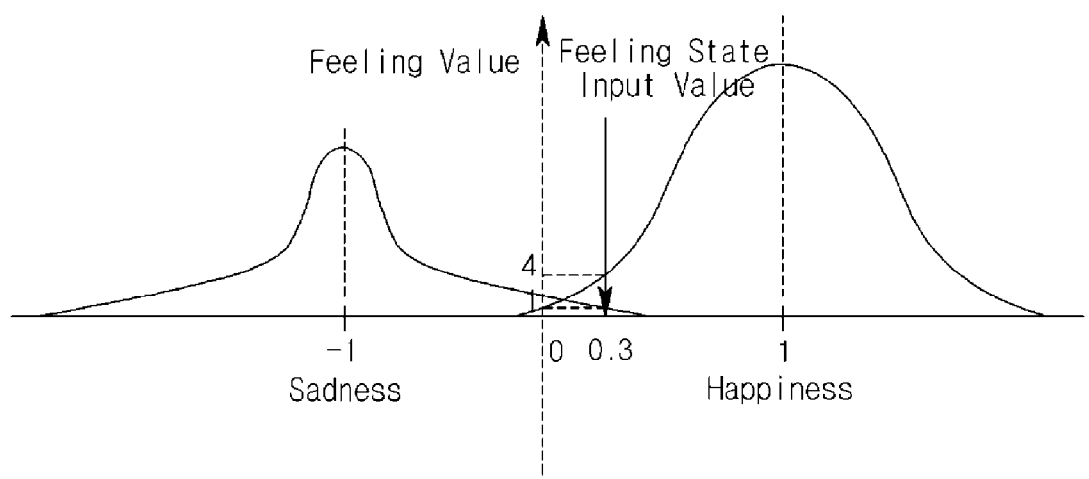
FIG. 6 is a schematic view for explaining an operation of a feeling creation apparatus of a robot according to the present invention.
Figure 7:
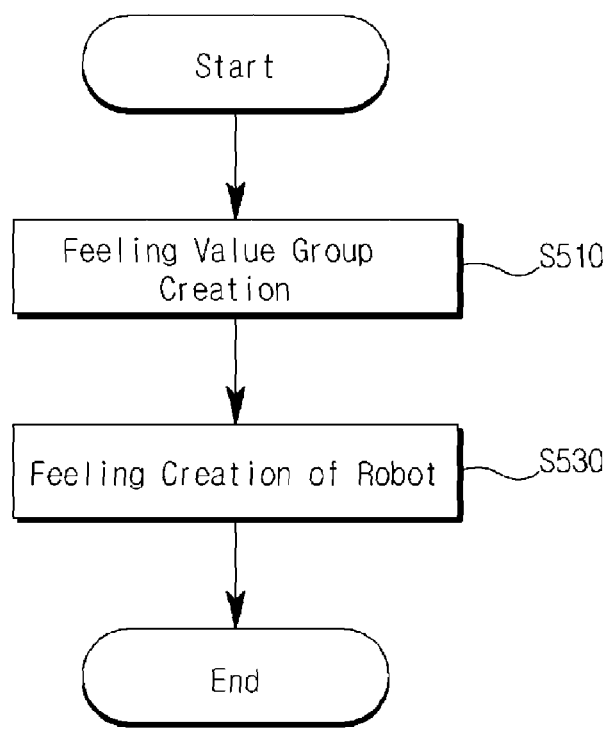
FIG. 7 is a flow chart of a feeling creation method of a robot according to an embodiment of the present invention.
Figure 8:
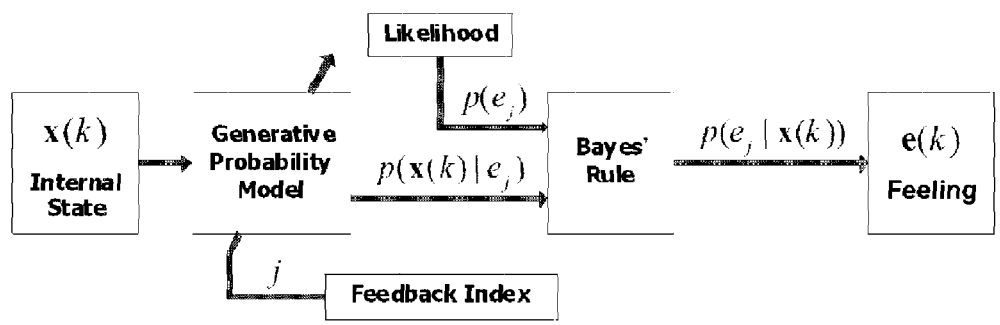
FIG. 8 is a schematic view for explaining a decision procedure of a feeling probability according to the present invention.

FIG. 6 is a view illustrating a feeling model which has two feeling probability distributions (feeling value group) with respect to different feelings on the 1-dimensional feeling space according to an embodiment of the present invention while showing an operation of the feeling creation apparatus for a robot. Referring to FIG. 6, the feeling model will be described below with the aid of a feeling curve positioned in a 1-dimensional internal state space for the sake of simplified descriptions.

As shown in FIG. 6, the coordinate of 1 of happiness and the coordinate of −1 of sadness are assigned to the 1-dimensional coordinate, and there is assigned a feeling probability distribution which defines Gaussian curve with respect to each basic feeling.

If the internal state input value is 0.3, the coordinate of 1 of happiness was the feeling of the robot in the conventional art; however in the feeling creation part 130 according to the present embodiment, the group {4, 1} of the feeling value of each feeling value group that the coordinate of 0.3 indicates becomes the feeling of a robot in the present invention. For the sake of the above expression, it is needed to previously set the order of elements of the group. In the present embodiment, it is set like {feeling value of happiness, feeling value of sadness}.

According to the present embodiment, it is possible to reliably create a combined feeling in which the magnitude of feeling of happiness is 4, and the magnitude of feeling of sadness is 1 without expressing the feeling of a robot with the coordinate of 1 which simply expresses happiness. At this time, since the combined feeling changes depending on the configuration of Gaussian curve, Gaussian curve can define the personalities of a robot.

In addition, when one internal state input value represents a plurality of input values in the feeling probability distribution, one feeling value can be extracted by selecting one of the largest value, the lowest value or a value closet to the mean value. Consequently, when the internal state coordinate system is expanded in a form of multiple dimensions, only one of the input values that the internal state input value indicates can be extracted per internal state.

Meanwhile the feeling creation part 130 can help express, in a form of probability, the feeling value of the group which is each element of the combined feelings in consideration with the simplified operations of the feeling expression apparatus of a robot which defines the feelings in accordance with an input. The probability expression means that the feeling value is expressed in a form of percentage or in a form of fraction of the total sum of 1. For example, if the feeling of a robot is {4, 1}, it might be expressed as {80, 20} in a form of percentage, and it can be expressed as {⅘, ⅕} in a form of fraction of the total sum of 1.

The behavior of the feeling creation apparatus of a robot according to the present invention will be described with the aid of mathematical equations.

A basic feeling is set on the internal state coordinate system. The feeling value of each feeling is decided by means of an internal state input value and a feeling probability distribution of each basic feeling, and the group of them defines a combined feeling. The probability distribution (feeling value group) of each feeling might be defined using GMM (Gaussian Mixture Model), and the probability expression of each feeling value can be calculated using Bayes' rule. The details thereon are described as below.

1) Definition of Internal State Vector x(k) which is a Creation Input Value of Feeling Value Group The feeling of a robot is created based on an internal state input value (vector) on the internal state coordinate system. The internal state input value x(k) is decided as the current state of a robot by a surrounding environment or an input from a sensor, which value might be decided in many different ways. As an example, it can be decided by NEO PI-R (the Revised NEO Personality Inventory), but they are not limited thereto.

The internal state input value x(k) has the same dimension as the number of the axes of the internal state coordinate system. For example, when it has an internal state of a 5-dimensional space using FFM (Five Factor Model in psychology), the internal sate input value x(k) is a 5th vector, and the state of the robot is decided by means of each value with the aid of the values of openness to experience, conscientiousness, agreeableness and neuroticism.

2) Definition of Feeling Vector which is a Feeling of a Robot

The final feeling is not simply expressed with only one feeling value, but is created with a combined value to which the probability values of different feeling values are reflected. The combined feeling can be expressed in a form of feeling vector e(k), and if a J-number of feelings is used, the feelings of a robot can be expressed with the following equation 1.

$$e(k) = [P(e_1|x(k))P(e_2|x(k)) \ldots P(e_j|x(k)) \ldots P(e_J|x(k))]^T \qquad \text{[Equation 1]}$$

where J means the number of basic feelings, and $e_j$ means the feeling value of the j-th basic feeling. For example, they may be e1=happiness, e2=surprise, e3=sadness, e4=love, e5=disgust, e6=fear, e7=angry. Since $[\ ]^T$ is a transposed matrix and is just one of the expression ways, so it might be deleted.

3) Setting of Feeling Probability Distribution $P(x(k)|e_j)$

The probability distribution with respect to each basic feeling is arranged on the internal state coordinate system. The probability distribution with respect to each basic feeling uses GMM (Gaussian Mixture Model). With it, it is possible to make dynamic the distribution of each basic feeling, and each feeling value can be independently calculated. The feeling probability $P(x(k)|e_j)$ (feeling probability, feeling value group) with respect to a j-th basic feeling on the n-dimensional internal state coordinate system can be decided by the following equation 2.

$$P(x(k)|e_j) = \sum_{m=1}^{M_j(k)} \omega_{j,m}(k) \cdot \eta(x(k)|\mu_{j,m}(k), \Sigma_{j,m}(k)) \qquad \text{[Equation 2]}$$

here, $$\eta(x(k)|\mu_{j,m}(k), \Sigma_{j,m}(k)) = \frac{1}{(2\pi)^{\frac{n}{2}} \|\Sigma_{j,m}(k)\|^{\frac{1}{2}}} \cdot \exp\left\{-\frac{1}{2}[x(k) - \mu_{j,m}(k)]^T \Sigma_{j,m}^{-1}(k)[x(k) - \mu_{j,m}(k)]\right\}$$

In addition, $\omega_{j,m}(k)$ is a m-th Gaussian distribution of a j-th feeling distribution or a weight value of a Gaussian mode at the time of k, and $M_j(k)$ is the number of Gaussian modes that the j-th feeling distribution has at the time of k, and $\mu_{j,m}(k)$ is a central value of the m-th Gaussian mode of the j-th feeling distribution at the time of k, and $\Sigma_{j,m}(k)$ is a bandwidth of the m-th Gaussian mode of the j-th feeling distribution at the time of k, and x(k) is the internal state input value at the time of k. The Gaussian mode means one Gaussian curve.

4) Calculation of $P(e_j|x(k))$ which is a Probabilistic Expression of a Feeling Value The probabilistic expression (probability value) of each feeling value can be calculated with the mathematic equation 3 using Bayes rule, and $P(e_j|x(k))$ which is the probability value of the j-th feeling can be used as the posterior probability.

$$P(e_j | x(k)) = \frac{P(x(k) | e_j)P(e_j)}{P(x(k))} = \frac{P(x(k) | e_j)P(e_j)}{\sum_{i=1}^{J} P(x(k) | e_i)P(e_i)} \quad \text{[Equation 3]}$$

where $P(x(k)|e_j)$ can be used as a likelihood function, and $P(e_j)$ is a probability (probability expression of feeling value) in which each feeling value can be selected as the prior probability of $e_j$, and the sum of the prior probability of each feeling value is 1.

According to the above described three equations 1 to 3, when a j-number of basic feelings is assigned, the feeling vector e(k) of the J-dimension with a j-number of $P(e_j|x(k))$ can be decided. Here, e(k) becomes a combined feeling to which a j-number of feeling values is actually reflected in a form of probabilistic expression.

Figure 1:
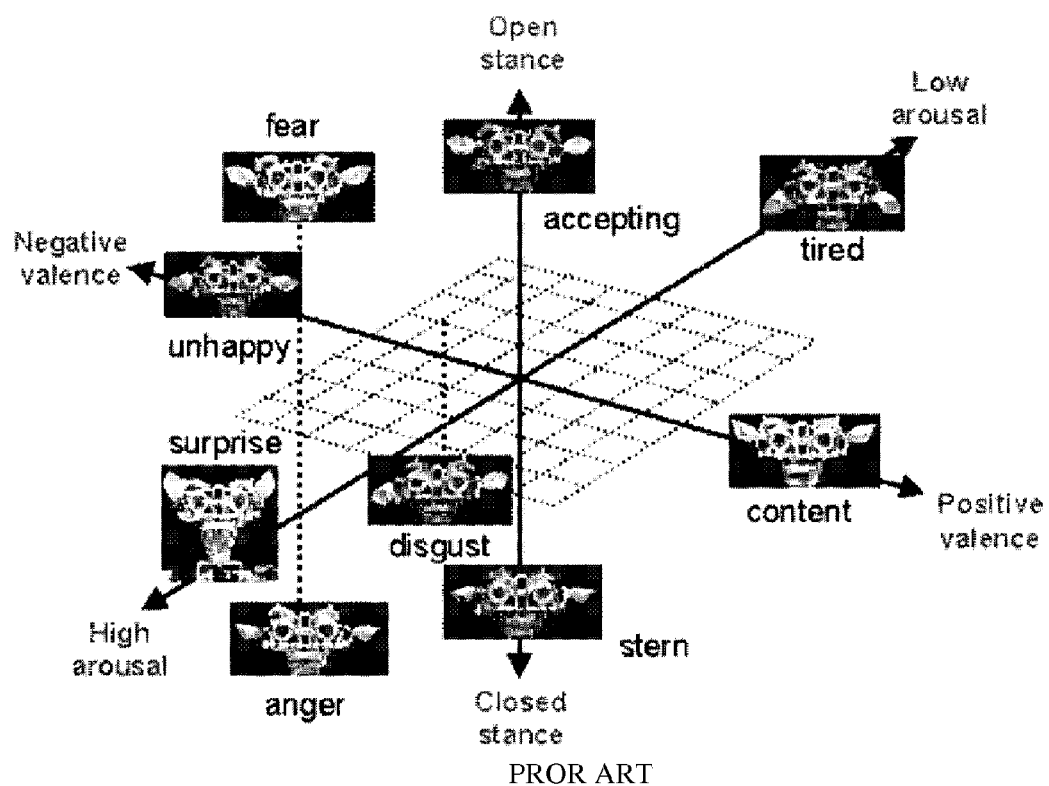
FIG. 1 is a schematic view illustrating a feeling space of a conventional robot.

FIG. 1 is a flow chart illustrating a method for creating the feelings of a robot according to an embodiment of the present invention.

First of all, the feeling value group having a feeling value which gradually decreases as it get farther from the coordinate of the basic feeling assigned to the robot is created in multiple numbers in the internal state coordinate system of the robot (S510).

The feeling value group can be created by adapting GMM (Gaussian Mixture Model) to the operation conducted by means of the feeling value group creation part 110. Afterward, $P(x(k)|e_j)$, which is the feeling value group, can be created after the equation 2 is conducted.

Next, the group of the feeling value of each feeling value group that the coordinate of the internal state input value indicates of the robot on the internal state coordinate system can be created as a feeling of a robot (S530).

Here, the internal state input value can match with the value outputted from an input part (not shown) of the robot. In this case, the input part might be a certain means which is configured to detect external environment information of a robot and outputs an internal state input value to match with one dot or a specific coordinate of the internal state coordinate system or a certain construction part matching with the means.

Bayes' rule can be adapted to the feeling value of the group in terms of the operation conducted in the feeling creation part 130, so each feeling value can be further converted, thus expressing each feeling value in a form of probability. $P(e_j|x(k))$ which is a probabilistic expression of the feeling value can be outputted after the equation 3 is conducted.

The method for creating the feelings of a robot according to the present can be recorded on a computer-readable recording medium in a form of a program that a computer can execute.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

The present invention can adapted to an apparatus for creating a machine apparatus such as a robot, etc., and can be used in order to create an input value of a feeling expression apparatus which can express feelings in different ways.

What is claimed is:

1. An apparatus for creating an artificial feeling, the apparatus comprising:
a processor;
a feeling value group creation part programmed to create a plurality of feeling value groups each having a plurality of feeling values, wherein each of the plurality of feeling values corresponds to at least one of a plurality of feeling coordinates including a basic feeling coordinate assigned to the apparatus in an internal state coordinate system of the apparatus and gradually decreases as each of the plurality of feeling coordinates gets farther from the basic feeling coordinate; and
a feeling creation part programmed to create a set comprising one or more feeling values of the plurality of feeling values, each selected from each feeling value group of the plurality of feeling value groups, wherein the set signifies a coordinate of an internal state input value of the apparatus in the internal state coordinate system and represents the artificial feeling of the apparatus.

2. The apparatus of claim 1, wherein each of the plurality of feeling value groups is either one single Gaussian distribution having a weight value, a central value and a distribution or a combined Gaussian distribution comprising a plurality of Gaussian distributions.

3. The apparatus of claim 2, wherein the feeling value group creation part is programmed to generate one feeling value group by combining the plurality of feeling value groups having the same basic feeling.

4. The apparatus of claims 3, wherein each feeling value of the set is expressed in a form of probability.

5. The apparatus of claim 3, wherein the artificial feeling of the apparatus is expressed by e(k) defined by the following equation 1:

$$e(k)=[P(e_1|x(k))P(e_2|x(k)) \ldots P(e_j|x(k)) \ldots P(e_J|x(k))]^T,$$

wherein J means the number of basic feelings, and $e_j$ means the feeling value of the j-th basic feeling, wherein the feeling probability distribution or feeling value group of $P(x(k)|e_j)$ with respect to the j-th basic feeling on the n-dimensional internal state coordinate system is defined by the following equation 2:

$$P(x(k)|e_j) = \sum_{m=1}^{M_j(k)} \omega_{j,m}(k) \cdot \eta(x(k) | \mu_{j,m}(k), \Sigma_{j,m}(k)),$$

wherein $$\eta(x(k) | \mu_{j,m}(k), \Sigma_{j,m}(k)) = \frac{1}{(2\pi)^{\frac{n}{2}} \|\Sigma_{j,m}(k)\|^{\frac{1}{2}}} \cdot \exp\left\{-\frac{1}{2}[x(k) - \mu_{j,m}(k)]^T \Sigma_{j,m}^{-1}(k)[x(k) - \mu_{j,m}(k)]\right\};$$

$\omega_{j,m}(k)$ is a weight value of a m-th Gaussian mode of a j-th feeling distribution at the time of k;

$M_j(k)$ is the number of Gaussian modes that the j-th feeling distribution has at the time of k;
$\mu_{j,m}(k)$ is a central value of the m-th Gaussian mode of the j-th feeling distribution at the time of k;
$\Sigma_{j,m}(k)$ is a bandwidth of the m-th Gaussian mode of the j-th feeling distribution at the time of k;
x(k) is the internal state input value at the time of k;
$[\,]^T$ is a transposed matrix; and
the probabilistic expression (probability value) of each feeling value of the feeling probability distribution or feeling value group $P(x(k)|e_j)$ is calculated using Bayes's rule as the following equation 3:

$$P(e_j|x(k)) = \frac{P(x(k)|e_j)P(e_j)}{P(x(k))} = \frac{P(x(k)|e_j)P(e_j)}{\sum_{i=1}^{J} P(x(k)|e_i)P(e_i)}$$

wherein:
$P(e_j|x(k))$ is a probability value of the j-th feeling used as a posterior probability;
$P(x(k)|e_j)$ is used as a likelihood function;
$P(e_j)$ is a probability in which each feeling value can be selected as the prior probability of $e_j$; and
the sum of the prior probability of each feeling value is 1.

6. A method of creating an artificial feeling for an apparatus, the method comprising:
creating a plurality of feeling value groups each having a plurality of feeling values, wherein each of the plurality of feeling values corresponds to at least one of a plurality of feeling coordinates including a basic feeling coordinate assigned to the apparatus having a processor in an internal state coordinate system of the apparatus and gradually decreases as each of the plurality of feeling coordinates gets farther from the basic feeling coordinate; and
creating a set comprising one or more feeling values of the plurality of feeling values, each selected from each feeling value group of the plurality of feeling value groups, wherein the set signifies a coordinate of an internal state input value of the apparatus in the internal state coordinate system and represents the artificial feeling of the apparatus.

7. The method of claim 6, wherein the step of creating the plurality of feeling value groups comprises:
creating one feeling value group in such a way to combine two or more of the plurality of feeling value groups having the same basic feeling by adapting GMM (Gaussian Mixture Model).

8. The method of claim 6, wherein the step of creating the set comprises:
converting each of the plurality of feeling values to be expressed in a form of probability by adapting Bayes' rule.

9. The method of claim 6, wherein the step of creating the set comprises:
creating, as the artificial feeling of the apparatus, e(k) which is defined by the following equation 1:

$$e(k)=[P(e_1|x(k))P(e_2|x(k))\ \ldots\ P(e_j|x(k))\ \ldots\ P(e_J|x(k))]^T,$$

wherein J means the number of basic feelings, and $e_j$ means the feeling value of the j-th basic feeling, and
wherein the feeling probability distribution or feeling value group of $P(x(k)|e_j)$ with respect to the j-th basic feeling on the n-dimensional internal state coordinate system is defined by the following equation 2:

$$P(x(k)|e_j) = \sum_{m=1}^{M_j(k)} \omega_{j,m}(k) \cdot \eta(x(k)|\mu_{j,m}(k), \Sigma_{j,m}(k)),$$

wherein:

$$\eta(x(k)|\mu_{j,m}(k), \Sigma_{j,m}(k)) = \frac{1}{(2\pi)^{\frac{n}{2}} \|\Sigma_{j,m}(k)\|^{\frac{1}{2}}} \cdot \exp\left\{-\frac{1}{2}[x(k)-\mu_{j,m}(k)]^T \Sigma_{j,m}^{-1}(k)[x(k)-\mu_{j,m}(k)]\right\};$$

$\omega_{j,m}(k)$ is a weight value of a m-th Gaussian mode of a j-th feeling distribution at the time of k;
$M_j(k)$ is the number of Gaussian modes that the j-th feeling distribution has at the time of k;
$\mu_{j,m}(k)$ is a central value of the m-th Gaussian mode of the j-th feeling distribution at the time of k;
$\Sigma_{j,m}(k)$ is a bandwidth of the m-th Gaussian mode of the j-th feeling distribution at the time of k;
x(k) is the internal state input value at the time of k;
$[\,]^T$ is a transposed matrix; and
the probabilistic expression (probability value) of each feeling value of the feeling P((k) probability distribution or feeling value group $P(x(k)|e_j)$ is calculated using Bayes's rule as defined by the following equation 3:

$$P(e_j|x(k)) = \frac{P(x(k)|e_j)P(e_j)}{P(x(k))} = \frac{P(x(k)|e_j)P(e_j)}{\sum_{i=1}^{J} P(x(k)|e_i)P(e_i)},$$

wherein: $P(e_j|x(k))$ is a probability value of the j-th feeling used as a posterior probability;
$P(x(k)|e_j)$ is used as a likelihood function;
$P(e_j)$ is a probability in which each feeling value can be selected as the prior probability of $e_j$; and
the sum of the prior probability of each feeling value is 1.

* * * * *